US008443656B2

(12) United States Patent
Hakariya et al.

(10) Patent No.: US 8,443,656 B2
(45) Date of Patent: May 21, 2013

(54) INTER-CYLINDER AIR-FUEL RATIO IMBALANCE ABNORMALITY DETECTION DEVICE FOR MULTI-CYLINDER INTERNAL COMBUSTION ENGINE AND ABNORMALITY DETECTION METHOD THEREFOR

(75) Inventors: Masashi Hakariya, Nagoya (JP); Yoshihisa Oda, Toyota (JP); Tatsuro Shimada, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/356,937

(22) Filed: Jan. 24, 2012

(65) Prior Publication Data

US 2012/0192633 A1 Aug. 2, 2012

(30) Foreign Application Priority Data

Jan. 28, 2011 (JP) ................. 2011-016675

(51) Int. Cl.
*G01M 15/10* (2006.01)
(52) U.S. Cl.
USPC .................... 73/114.63; 73/114.39
(58) Field of Classification Search
USPC .......................... 73/114.39, 114.63
See application file for complete search history.

(56) References Cited

U.S. PATENT DOCUMENTS

| 5,651,351 | A | 7/1997 | Matsumoto et al. | |
| 6,006,154 | A * | 12/1999 | Wang | 701/110 |
| 6,230,095 | B1 * | 5/2001 | Wang | 701/110 |
| 7,519,467 | B2 * | 4/2009 | Katoh | 701/103 |
| 7,823,563 | B2 * | 11/2010 | Jankovic et al. | 123/436 |
| 7,926,330 | B2 * | 4/2011 | Huang et al. | 73/114.38 |
| 8,302,581 | B2 * | 11/2012 | Nishikiori et al. | 123/434 |
| 2008/0040018 | A1 * | 2/2008 | Katoch | 701/103 |
| 2010/0017098 | A1 | 1/2010 | Fukuchi et al. | |
| 2012/0253642 | A1 * | 10/2012 | Kitano et al. | 701/104 |
| 2012/0277979 | A1 * | 11/2012 | Kato et al. | 701/104 |
| 2012/0297866 | A1 * | 11/2012 | Tanaka et al. | 73/114.31 |

FOREIGN PATENT DOCUMENTS

| JP | 03294659 A | 12/1991 |
| JP | 08-200115 A | 8/1996 |
| JP | 10-184440 A | 7/1998 |
| JP | 2004-052620 A | 2/2004 |
| JP | 2004-138036 A | 5/2004 |
| JP | 2008-267239 A | 11/2008 |
| JP | 2010024977 A | 2/2010 |
| WO | 9610691 A1 | 4/1996 |

* cited by examiner

*Primary Examiner* — Freddie Kirkland, III
(74) *Attorney, Agent, or Firm* — Gifford, Krass, Sprinkle, Anderson & Citkowski, P.C.

(57) ABSTRACT

The invention provides an inter-cylinder air-fuel ratio imbalance abnormality detection device for a multi-cylinder internal combustion engine, in which when abnormality detection processing of detecting an inter-cylinder air-fuel ratio imbalance abnormality on the basis of revolution speed fluctuations of the multi-cylinder internal combustion engine and ignition timing control for controlling the ignition timing so as to restrict revolution speed fluctuations in the multi-cylinder internal combustion engine are implemented, the implementation of the ignition timing control is restricted when the abnormality detection processing is implemented, and an abnormality detection method to be used in such a device.

7 Claims, 8 Drawing Sheets

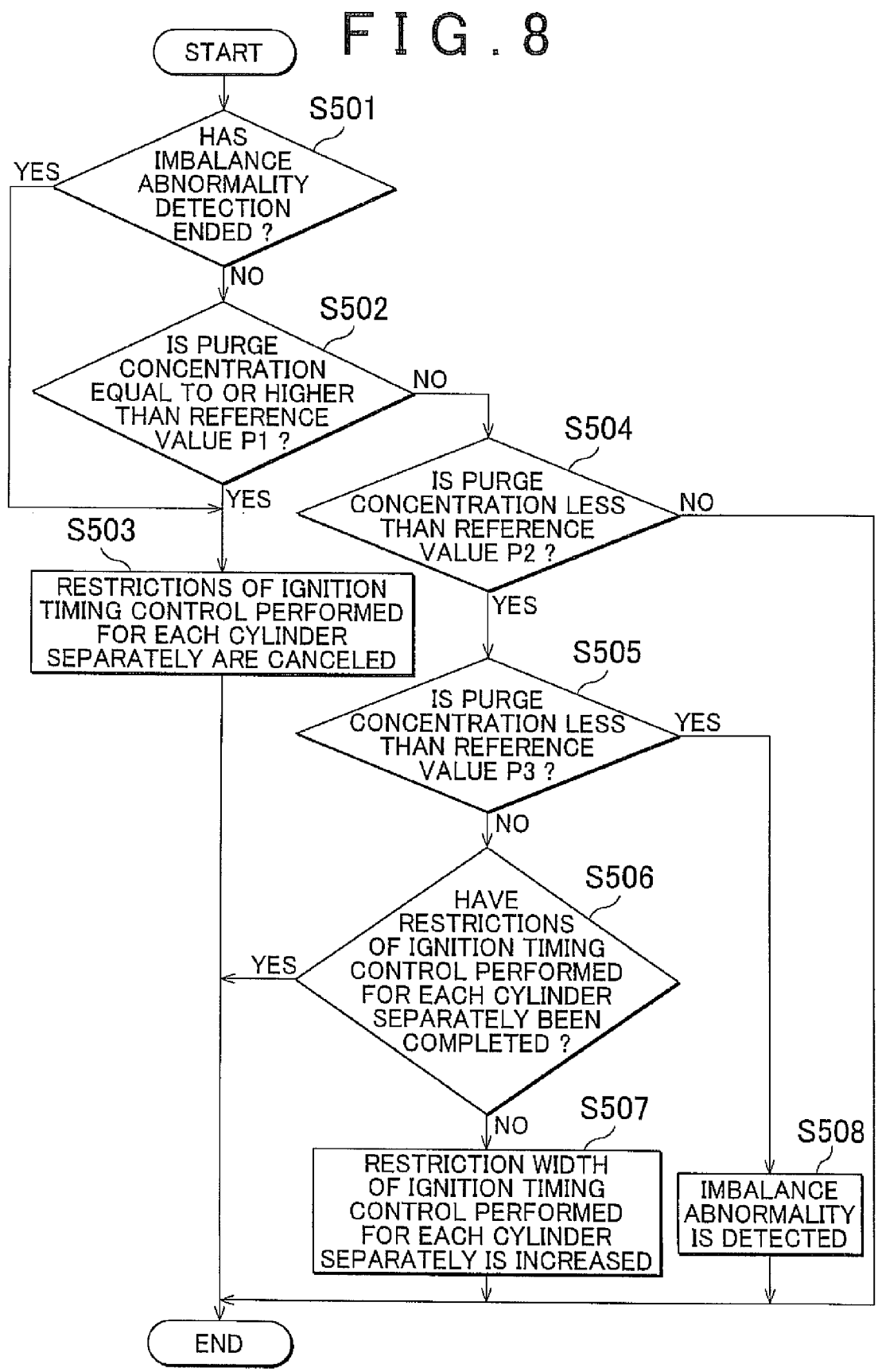

INTER-CYLINDER AIR-FUEL RATIO IMBALANCE ABNORMALITY DETECTION DEVICE FOR MULTI-CYLINDER INTERNAL COMBUSTION ENGINE AND ABNORMALITY DETECTION METHOD THEREFOR

CROSS REFERENCE TO RELATED APPLICATIONS

This application claims priority to Japanese Patent Application No. 2011-016675 filed on Jan. 28, 2011, which is incorporated herein by reference in its entirety including the specification, drawings and abstract.

BACKGROUND OF THE INVENTION

1. Field of the Invention

The invention relates to a device for detecting inter-cylinder air-fuel ratio imbalance abnormality in a multi-cylinder internal combustion engine, and more particularly to a device for detecting a comparatively large imbalance of air-fuel ratio between the cylinders in a multi-cylinder internal combustion engine and to an abnormality detection method therefore.

2. Description of Related Art

In an internal combustion engine provided with an exhaust gas purification system using a catalyst, it is generally necessary to control a mixing ratio of air and fuel in a mixed gas burned in the internal combustion engine, that is, to control the air-fuel ratio in order to perform highly efficient catalytic purification of hazardous components present in the exhaust gas. In order to perform such control of air-fuel ratio, an air-fuel ratio sensor is provided in an exhaust gas passage of the internal combustion engine and feedback control is implemented such as to match the air-fuel ratio detected by the sensor with a predetermined target air-fuel ratio.

In a multi-cylinder internal combustion engine, the air-fuel ratio control is usually performed by using the same control amount for all of the cylinders. Therefore, the actual air-fuel ratio can vary between the cylinders even when the air-fuel ratio control is implemented. Where the degree of such imbalance is small, it can be absorbed by the air-fuel ratio feedback control and the purification processing of hazardous components contained in the exhaust gas can be performed with the catalyst. As a result, no effect is provided on exhaust gas emission and no particular problem is encountered.

However, where the inter-cylinder imbalance of air-fuel ratio is large, for example, due to a failure of fuel injection system of some cylinders, the exhaust gas emission is degraded, thereby causing problems. It is desirable that such a large imbalance of air-fuel ratio that causes degradation of exhaust gas emission be detected as an abnormality. In particular, in the case of internal combustion engines for automobiles, it is required that the inter-cylinder imbalance abnormality of air-fuel ratio be detected in the onboard state in order to prevent reliably the vehicle from running with degraded exhaust gas emission, and some countries have recently moved to regulate such detection by law.

Since such inter-cylinder imbalance of air-fuel ratio causes torque pulsations, the inter-cylinder imbalance can be detected on the basis of revolution speed fluctuations in the internal combustion engine. In the control device disclosed in Japanese Patent Application Publication No. 2004-52620 (JP-A-2004-52620), the inter-cylinder imbalance is determined from revolution speed fluctuations, and driving comfort is improved by correcting the ignition timing according to the inter-cylinder imbalance.

However, in order to determine the inter-cylinder imbalance of air-fuel ratio with good accuracy on the basis of revolution fluctuations, it is desirable that changes in revolution speed be large during the detection. Meanwhile, since large revolution speed fluctuations adversely affect drivability, a method of advancing the ignition timing separately for each cylinder is used to restrict such fluctuations (ignition timing control conducted for each cylinder separately). However, where the ignition timing control is performed for each cylinder separately, revolution speed fluctuations decrease and the inter-cylinder imbalance of air-fuel ratio is difficult to detect with good accuracy. Thus, it can be said that the detection of inter-cylinder imbalance and ignition timing control conducted for each cylinder separately are in a trade-off relationship with respect to the size of revolution fluctuations, and the problem is that the implementation of ignition timing control conducted for each cylinder separately results in decreased detection accuracy of inter-cylinder imbalance.

SUMMARY OF THE INVENTION

With the foregoing in view, the invention provides an abnormality detection device that improves the detection accuracy of inter-cylinder imbalance abnormality of air-fuel ratio and prevents erroneous detection in a multi-cylinder internal combustion engine in which ignition timing control can be implemented for each cylinder separately. The invention also provided an abnormality detection method for the aforementioned abnormality detection device.

The first aspect of the invention resides in an inter-cylinder air-fuel ratio imbalance abnormality detection device for a multi-cylinder internal combustion engine, provided with an abnormality detector that detects an inter-cylinder air-fuel ratio imbalance abnormality on the basis of revolution speed fluctuations in the multi-cylinder internal combustion engine; an ignition timing control device that controls ignition timing so as to restrict revolution speed fluctuations in the multi-cylinder internal combustion engine; and a restricting device that restricts the operation of the ignition timing control device when the abnormality detector is operated.

The second aspect of the invention resides in an inter-cylinder air-fuel ratio imbalance abnormality detection method for a multi-cylinder internal combustion engine. This abnormality detection method includes: detecting an inter-cylinder air-fuel ratio imbalance abnormality on the basis of revolution speed fluctuations in the internal combustion engine; controlling ignition timing so as to restrict revolution speed fluctuations in the multi-cylinder internal combustion engine; and restricting the implementation of the ignition timing control when the abnormality detection is implemented.

With the above-described inter-cylinder air-fuel ratio imbalance abnormality detection device and imbalance abnormality detection method, the implementation of the ignition timing control is restricted when the abnormality detection is implemented. Therefore, the decrease in revolution speed fluctuations in the internal combustion engine that is caused by the implementation of the ignition timing control is restricted when the abnormality detection is implemented. Since the decrease in revolution speed fluctuations that follows the implementation of the ignition timing control is thus restricted, the detection accuracy of inter-cylinder air-fuel ratio imbalance abnormality can be improved and erroneous detection can be prevented.

In the inter-cylinder air-fuel ratio imbalance abnormality detection device, the restricting device may completely inhibit the operation of the ignition timing control device when the abnormality detection device is operated, and may partially inhibit the operation of the ignition timing control device when the abnormality detection device is operated. By completely inhibiting the ignition timing control, the reduction of revolution speed fluctuations in the internal combustion engine caused by ignition timing control is eliminated. Therefore, the detection accuracy of imbalance abnormality is increased. Further, by partially inhibiting the ignition timing control conducted for each cylinder separately, that is, partially restricting and partially allowing the control, it is possible to restrict the degradation of emission from the internal combustion engine and reduce revolution speed fluctuations in the internal combustion engine.

In the aforementioned inter-cylinder air-fuel ratio imbalance abnormality detection device, the restricting device may gradually restrict the ignition timing control of the ignition timing control device when the abnormality detection device is operated. With such an abnormality detection device, the ignition timing control conducted for each cylinder separately is gradually restricted. Therefore, rapid degradation of level of vibrations in the internal combustion engine can be restricted.

Further, in the aforementioned inter-cylinder air-fuel ratio imbalance abnormality detection device, the restricting device may implement abnormality detection when a control amount determined by ignition timing control of the ignition timing control device is equal to or less than a predetermined value and not implement abnormality detection when the control amount is greater than the predetermined value. With such an abnormality detection device, the detection accuracy of imbalance abnormality detection can be ensured, without restricting the ignition timing control conducted for each cylinder separately.

The inter-cylinder air-fuel ratio imbalance abnormality detection device may additionally include a purge device that purges evaporated fuel into an intake system and a purge concentration detection device that detects a purge concentration in the intake system, and the restricting device may cancel the restriction of operation of the ignition timing control device before the operation of the abnormality detection device when the purge concentration is equal to or greater than a predetermined value.

In an internal combustion engine having a purging device that purges the evaporated fuel that has evaporated from the fuel tank into the intake system, when large revolution speed fluctuations occur due to combustion instability caused by a high concentration of purge, it is impossible to determine whether such large revolution speed fluctuations are caused by inter-cylinder imbalance of air-fuel ratio or high concentration of purge. Therefore, in such an internal combustion engine, "the condition of the purge concentration being less than a predetermined value" is necessary as a prerequisite condition for implementing the detection of inter-cylinder air-fuel ratio imbalance abnormality. However, for example, where a high purge concentration is maintained in such a configuration, the detection of imbalance abnormality is not performed in this period and a state in which an inter-cylinder air-fuel ratio imbalance abnormality is present is allowed for a long time. In this respect, in the above-described abnormality detection device, when the purge concentration is equal to or higher than a predetermined value, the restricting device cancels the restriction of implementation of the ignition timing control conducted for each cylinder separately before the imbalance abnormality detection device is operated. Therefore, drivability of the vehicle carrying the internal combustion engine is improved by restriction of revolution speed fluctuations obtained due to the operation of the ignition timing control device.

The invention demonstrates excellent effects of making it possible to improve detection accuracy and prevent erroneous detection by restricting the reduction of revolution speed fluctuations caused by the implementation of ignition timing control.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 8 is a flowchart illustrating a mixing control routine in the fifth embodiment.

DETAILED DESCRIPTION OF EMBODIMENTS

An embodiment of the invention will be described below with reference to the appended drawings.

Figure 1:
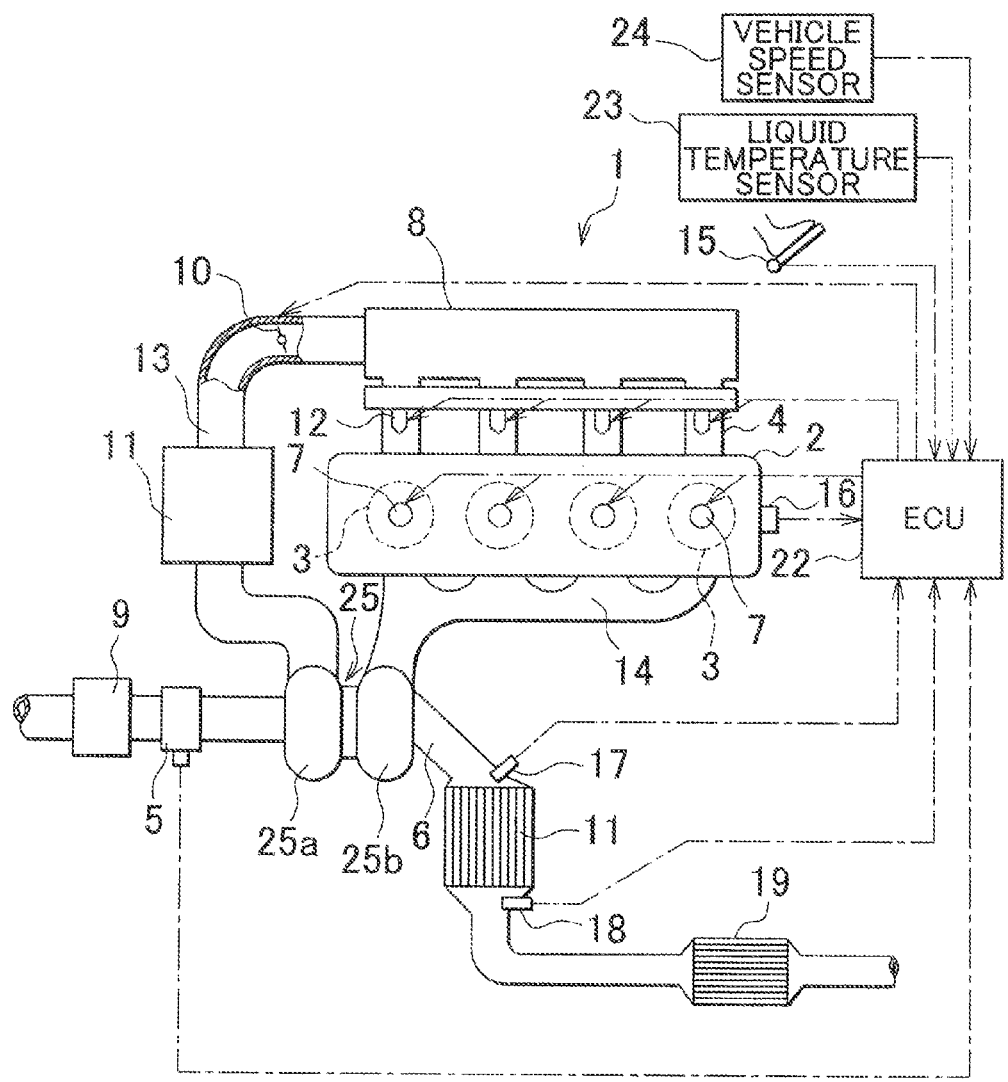
FIG. 1 is a schematic diagram illustrating the internal combustion engine according to one embodiment of the invention.

FIG. 1 is a schematic drawing of an internal combustion engine according to the embodiment. As shown in the figure, an internal combustion engine (engine) 1 generates power by burning a mixed gas of fuel and air inside a combustion chamber 3 formed in a cylinder block 2 and causing pistons to perform reciprocating movement inside a combustion chamber 3. The internal combustion engine 1 of the embodiment is a multi-cylinder internal combustion engine installed on an automobile, more specifically an in-line four-cylinder internal combustion engine of a spark ignition system. However, the internal combustion engine in which the invention can be used is not limited to such a configuration, and the number of cylinders and engine system are not particularly limited, provided that the engine is a multi-cylinder internal combustion engine.

The cylinder head of each cylinder of the internal combustion engine 1 is provided with an intake valve that opens and closes an intake port and an exhaust valve that opens and closes an exhaust port, and the intake valves and exhaust valves are opened and closed by a camshaft (this configuration is not shown in the figures). A sparkplug 7 for igniting the mixed gas inside the combustion chamber 3 is provided at the top portion of cylinder head in each cylinder.

The intake port of each cylinder is connected by a branch pipe 4 provided for each cylinder to a surge tank 8 serving as an intake collector. An intake pipe 13 is connected upstream of the surge tank 8, and an air cleaner 9 is provided upstream of the intake pipe 13. An air flowmeter 5 for detecting the intake air amount (amount of intake air per unit time, that is, intake flow rate) and an electronically controlled throttle valve 10 are incorporated in the intake pipe 13 in the order of description from the upstream side. The intake port, branch pipe 4, surge tank 8, and intake pipe 13 form an intake passage.

An injector (fuel injection valve) 12 that injects fuel into the intake passage, in particular into the intake port, is provided for each cylinder. The fuel injected from the injector 12 is mixed with the intake air, thereby forming a mixed gas. The mixed gas is sucked into the combustion chamber 3 when the intake valve is open, compressed by the piston, ignited by the ignition plug 7, and burned.

The exhaust port of each cylinder is connected to the exhaust manifold 14. The exhaust manifold 14 is constituted by branch pipes (one for each cylinder) that constitute the upstream portion of the exhaust manifold and an exhaust collector constituting the downstream side thereof. An exhaust pipe 6 is connected downstream of the exhaust collector. The exhaust ports, exhaust manifold 14, and exhaust pipes 6 form an exhaust passage. A portion of the exhaust manifold 14 downstream of the exhaust collector forms a collection section where the exhaust gas of cylinders is collected.

Catalysts configured by three-way catalysts, namely, an upstream catalyst 11 and a downstream catalyst 19 are mounted in series upstream and downstream of the exhaust pipe 6, respectively. First and second air-fuel ratio sensors, that is, a pre-catalyst sensor 17 and a post-catalyst sensor 18, for detecting the air-fuel ratio of exhaust gas are provided upstream and downstream of the upstream catalyst 11, respectively. These pre-catalyst sensor 17 and post-catalyst sensor 18 are provided at positions immediately before and immediately after the upstream catalyst 11 and detect the air-fuel ratio on the basis of oxygen concentration in the exhaust gas. Thus, a single pre-catalyst sensor 17 is provided in the collection section of the exhaust passage.

The aforementioned ignition plug 7, throttle valve 10, and injector 12 are electrically connected to an electronic control unit (ECU) 22 serving as a control means. the ECU 22 includes a central processing unit (CPU), a read-only memory (ROM), a random access memory (RAM), an input/output port, and a storage device (none of them is shown in the figure). Further, as shown in the figure, a crank angle sensor 16 that detects the crank angle of the internal combustion engine 1, an accelerator depression amount sensor 15 that detects the accelerator depression amount, a liquid temperature sensor 23 that detects the temperature of cooling liquid in the internal combustion engine 1, a vehicle speed sensor 24 that detects the speed of the vehicle, and other sensors are electrically connected by means of an A/D converter (not shown in the figure), in addition to the aforementioned air flow meter 5, pre-catalyst sensor 17, and post-catalyst sensor 18, to the ECU 22. On the basis of the detection values of these sensors, the ECU 22 controls the sparkplug 7, throttle valve 10, and injector 12, thereby controlling the ignition timing, fuel injection amount, fuel injection timing, and throttle opening degree, so as to obtain the desired output. The throttle opening degree is usually controlled to a value corresponding to the accelerator depression amount.

Figure 2:
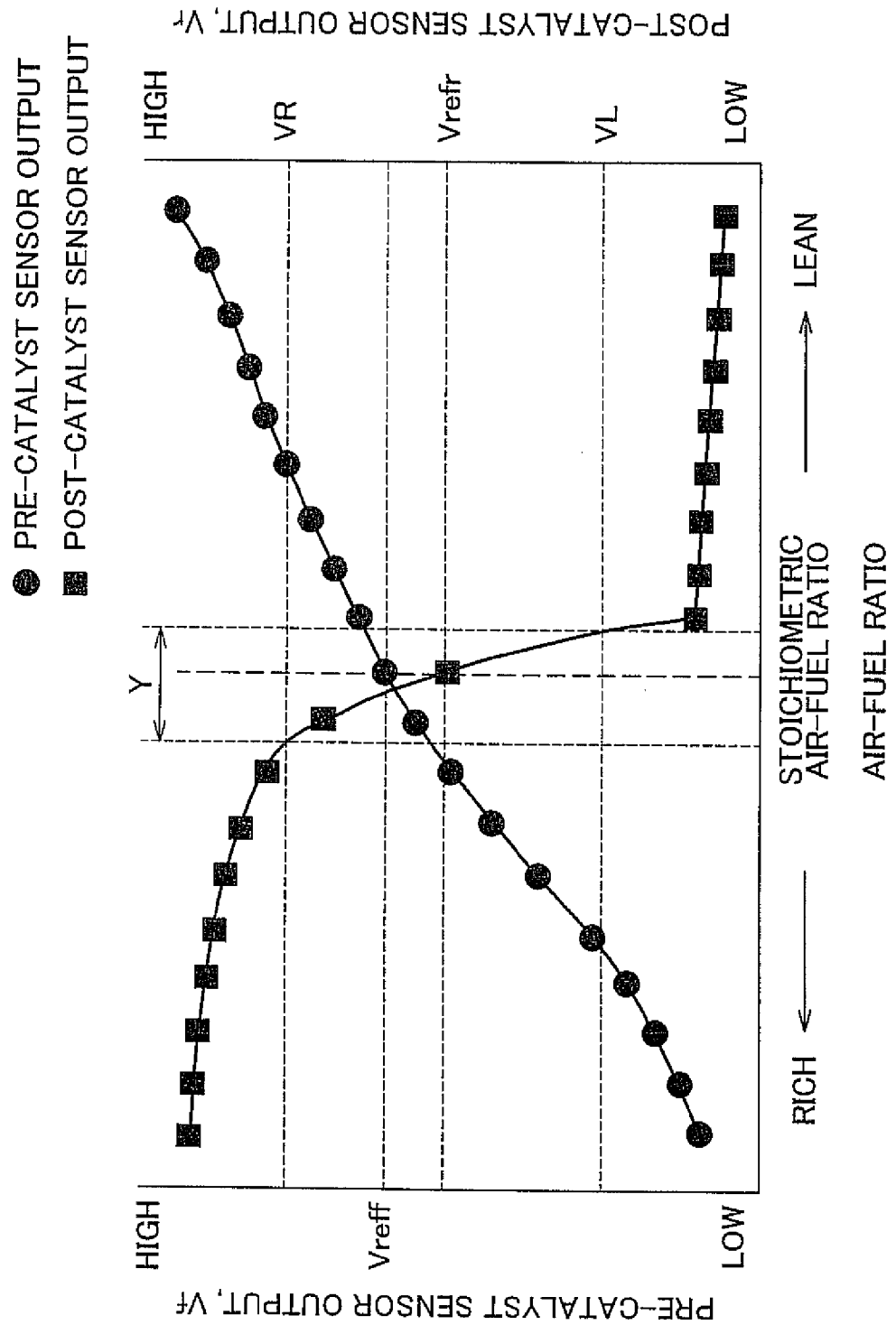
FIG. 2 is a graph illustrating the output characteristics of the pre-catalyst sensor and post-catalyst sensor in the internal combustion engine of one embodiment of the invention.

The pre-catalyst sensor 17 is constituted by the so-called wide-range air-fuel ratio sensor and can continuously detect the air-fuel ratio within a comparatively wide range. FIG. 2 shows an output characteristic of the pre-catalyst sensor 17. As shown in the figure, the pre-catalyst sensor 17 outputs a voltage signal Vf of a size proportional to the detected exhaust air-fuel ratio (pre-catalyst air-fuel ratio A/Ff). The output voltage at the time the exhaust air-fuel ratio is stoichiometric (stoichiometric air-fuel ratio, for example, A/F=14.6) is Vreff (for example, about 3.3 V).

Meanwhile, the post-catalyst sensor 18 is the so-called O2 sensor and has a characteristic in which the output value changes rapidly on a stoichiometric value as a boundary. FIG. 2 shows the output characteristic of the post-catalyst sensor 18. As shown in the figure, the output voltage at the time the exhaust air-fuel ratio (post-catalyst air-fuel ratio A/Fr) is stoichiometric, that is, the value corresponding to the stoichiometric state, is Vrefr (for example, 0.45 V). the output voltage of the post-catalyst sensor 18 changes within a predetermined range (for example, 0 to 1 V). Where the exhaust air-fuel ratio is leaner that the stoichiometric value, the output voltage of the post-catalyst sensor becomes less than the value Vrefr corresponding to the stoichiometric state, and when the exhaust air-fuel ratio is richer than the stoichiometric value, the output voltage of the post-catalyst sensor becomes higher than the value Vrefr corresponding to the stoichiometric state.

The upstream catalyst 11 and downstream catalyst 19 simultaneously purify NOx, HC, and CO, which are hazardous components contained in the exhaust gas, when the air-fuel ratio A/F of the exhaust gas flowing to the catalysts is close to the stoichiometric value. The width (window) of air-fuel ratio in which the three aforementioned compounds can be purified simultaneously with high efficiency is comparatively narrow.

The air-fuel ratio control (stoichiometric control) is implemented by the ECU 22 so as to control the air-fuel ratio of the exhaust gas flowing to the upstream catalyst 11 to the vicinity of the stoichiometric value. The air-fuel ratio control is constituted by the main air-fuel ratio control (main air-fuel ratio feedback control) such that matches the exhaust air-fuel ratio detected by the pre-catalyst sensor 17 with a stoichiometric value which is a predetermined target air-fuel ratio and an auxiliary air-fuel ratio control (auxiliary air-fuel ratio feedback control) such that matches the exhaust air-fuel ratio detected by the post-catalyst sensor 18 with the stoichiometric value.

Detection of inter-cylinder air-fuel ratio imbalance abnormality will be explained below. For example, let us assume that injectors 12 in some cylinders from among all of the cylinders have failed and an air-fuel ratio imbalance has occurred between the cylinders. As an example, the case will be considered in which the fuel injection amount in cylinder #1 became higher than in cylinders #2, #3, and #4 and the air-fuel ratio shifted significantly to the rich side. In such a case, the air-fuel ratio of the total gas supplied to the pre-catalyst sensor 17 can still be controlled to the stoichiometric value if a comparatively large correction amount is imparted by the aforementioned main air-fuel ratio feedback control. However, where the cylinders are considered separately, it is clear that the cylinder #1 has an air-fuel ratio richer than the stoichiometric value and cylinders #2, #3, and #4 have air-fuel ratios leaner than the stoichiometric value, and that the stoichiometric value is merely obtained as a total balance, which is undesirable from the standpoint of emission. Accordingly, the device of the embodiment is configured to detect such an inter-cylinder air-fuel ratio imbalance abnormality on the basis of revolution speed fluctuations.

Figure 3:
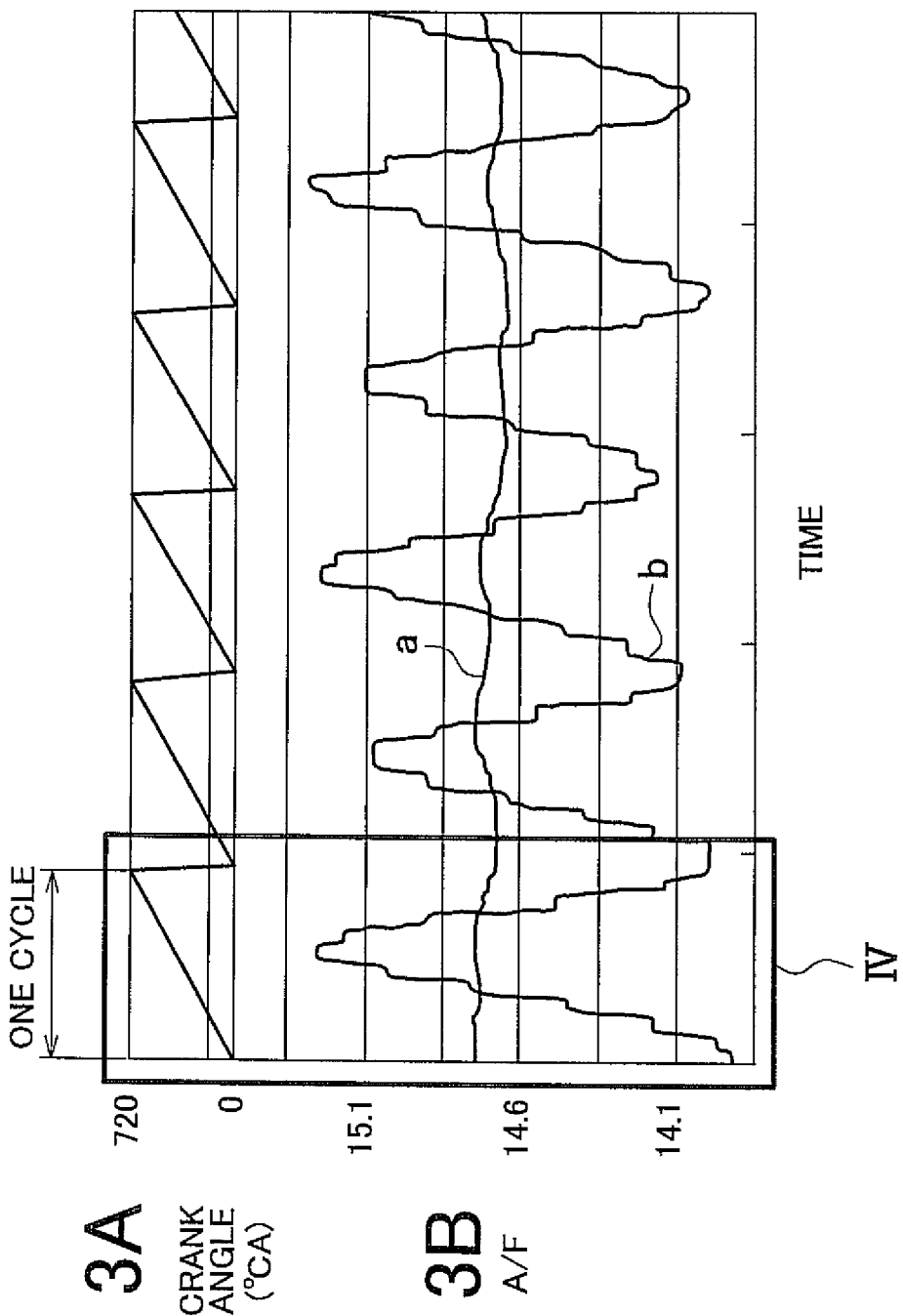
FIG. 3 is a graph illustrating fluctuations of air-fuel ratio sensor output in the internal combustion engine of one embodiment of the invention.

As shown in FIG. 3, the exhaust air-fuel ratio A/F detected by the pre-catalyst sensor 17 tends to change periodically, with one engine cycle (=720° CA) being one period (for example, curve a). Where an inter-cylinder air-fuel ratio imbalance occurs, the changes within one engine cycle increase (for example, curve b).

Here, the deviation value Dev (#1) is a parameter representing the degree of imbalance of air-fuel ratio between the cylinders. For example, the time period T30 required for rotation through a crank angle of 30° CA is calculated on the basis of output signals of the crank angle sensor 16 with respect to a period corresponding to the combustion stroke in each cylinder (#i=1, 2, 3, 4), and a revolution speed fluctuation value ΔT30 is obtained by performing moderation processing according to the following Eq. (1) with respect to a difference value ΔTT30 (#i) between the maximum value T30max (#i) and minimum value T30min (#i).

$$\Delta T30(\#i)=\Delta T30(\#i)\text{old}+k\times\{\Delta TT30(\#i)-\Delta T30(\#i)\text{old}\} \quad \text{(Eq. 1)}$$

Here, ΔT30 (#i) old is the previous revolution speed fluctuation.

The ratio of the difference value of the revolution speed value ΔT30 (#i) thus obtained and the average value ΔT30ave for all of the cylinders to the average value ΔT30ave is calculated as the deviation value Dev (#i) from Eq. (2).

$$\text{Dev}(\#i)=\{\Delta T30(\#i)-\Delta T30\text{ave}\}/\Delta T30\text{ave} \quad \text{(Eq. 2)}$$

The larger is the deviation value Dev (#i), the greater is the fuel injection amount deviation in the imbalanced cylinder with respect to the balanced cylinder and the greater is the air-fuel ratio imbalance degree. Accordingly, where the deviation value Dev (#i) is equal to or greater than a predetermined abnormality determination value, it is determined that an imbalance abnormality is present, and where the deviation value Dev (#i) is less than a predetermined abnormality determination value, it is determined that an imbalance abnormality is absent, that is, a normal operation state is realized.

A mixing control routine will be explained below. As mentioned hereinabove, in order to determine the inter-cylinder imbalance of air-fuel ratio with good accuracy on the basis of revolution speed fluctuations, it is desirable that the revolution speed fluctuations during the detection be large. Meanwhile, since large revolution fluctuations adversely affect drivability, a method of advancing the ignition timing separately for each cylinder is used to restrict such fluctuations (ignition timing control conducted for each cylinder separately). However, where the ignition timing control is performed for each cylinder separately, revolution speed fluctuations decrease and the inter-cylinder imbalance of air-fuel ratio is difficult to detect with good accuracy. Thus, it can be said that the detection of inter-cylinder imbalance and ignition timing control conducted for each cylinder separately are in a trade-off relationship with respect to the size of revolution fluctuations. With consideration for such a phenomenon, in the embodiment, the operation of ignition timing control device is restricted by the following mixing control routine when the abnormality detection device is operated, thereby restricting the decrease in revolution speed fluctuations caused by the operation of the ignition timing control device during the operation of the abnormality detection device.

Figure 4:
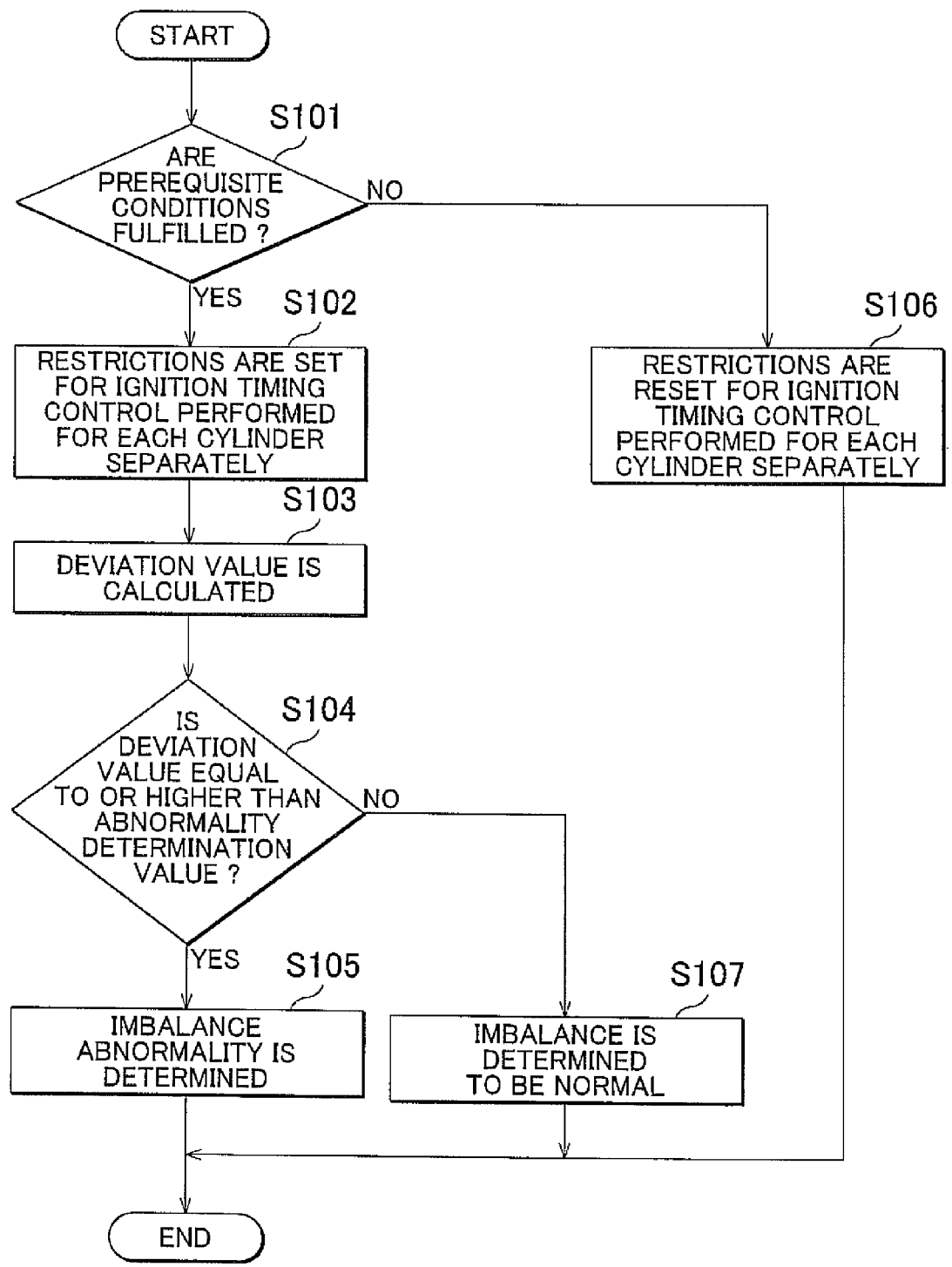
FIG. 4 is a flowchart illustrating a mixing control routine in the first embodiment of the invention.

The mixing control routine will be explained below with reference to FIG. 4. The routine is implemented periodically by the ECU 22, for example, with the aforementioned sample period T.

First, in step S101, it is determined whether or not the prerequisite conditions suitable for performing the imbalance abnormality detection have been fulfilled. The prerequisite conditions are fulfilled when all of the following conditions are fulfilled. (1) The engine warm-up has been completed. For example, the warm-up is assumed to be completed when the liquid temperature detected by the liquid temperature sensor 23 is equal to or higher than the predetermined value. (2) The vehicle speed is 0. This determination is made, for example, on the basis of the detection value of the vehicle speed sensor 24. (3) The engine is idling. This determination is made, for example, on the basis of the detection value of the crank angle sensor 16. (4) The imbalance detection has not ended, or a predetermined period has not elapsed or a predetermined distance has not been traveled since the end of previous imbalance detection.

When the prerequisite conditions are fulfilled, a restriction of the ignition timing control conducted for each cylinder separately is set in step S102. This restriction is performed, for example, by setting a predetermined restriction flag in the ECU 22. The restriction flag is referred to in a separate routine for ignition timing control conducted for each cylinder separately, and where the restriction flag has been set, the ignition timing control conducted for each cylinder separately is not performed.

Then, the inter-cylinder air-fuel ratio imbalance abnormality based on revolution speed fluctuations is detected (S103 to S105 and S107). First, the deviation value Dev (#i) is calculated by the above-described procedure on the basis of the detection value of the crank angle sensor 16 (S103), and the calculated deviation value is compared with an abnormality determination value (S104). Where the deviation value Dev (#i) is equal to or greater than the predetermined abnormality determination value, it is determined that an imbalance abnormality is present (S105), and where the deviation value Dev (#i) is less than the abnormality determination value, it is determined that no imbalance abnormality is present, that is, a normal state is realized (S107) and the routine is ended. At the time the presence of abnormality is determined or when the presence of abnormality is determined in two trips in a row (that is, in two sequential trips from the engine start to the engine stop), a warning device such as a check lamp that should notify the user of the abnormality is turned on. Further, the abnormality information is preferably stored in a predetermined diagnosis system in the form such that the information can be called out by a maintenance operator.

Meanwhile, when the prerequisite conditions are not fulfilled in step S101, the restriction on the ignition timing control conducted for each cylinder separately is reset in step S106 and the routine is ended. As a result, in the separate routine of ignition timing control conducted for each cylinder separately, the ignition timing control conducted for each cylinder separately is performed without restrictions. Thus, for example, the deviation value Dev (#i) is calculated on the basis of detection values of the crank angle sensor 16 by the processing similar to that of the abovementioned step S103, and the ignition timing of the cylinder is advanced or delayed by an amount determined by a predetermined map or function according to the value of the deviation value Dev (#i) so as to zero the deviation value Dev (#i).

In the embodiment, as a result of the above-described processing, the implementation of ignition timing control is restricted when the abnormality detection processing is implemented (S103 to S105 and S107). Therefore, the reduction of revolution speed fluctuations caused by the implementation of the ignition timing control is restricted during the operation of the abnormality detection device. Therefore, in the embodiment, the detection accuracy of inter-cylinder air-fuel ratio imbalance abnormality can be increased and erroneous detection can be prevented.

Further, in the embodiment, "(4) the imbalance detection has not ended" is used in step S101 as a prerequisite condition for restricting (S102) the ignition timing control conducted for each cylinder separately. Therefore, it can be guaranteed that the cancellation (S106) of the ignition timing control restriction is performed only when the imbalance detection (S103 to S105 and S107) has ended. As a result, the level of vibrations of the internal combustion engine is prevented from changing from good (small) to poor (large). Therefore, the degradation of merchantability caused by the change in the level of vibrations can be restricted.

The second embodiment of the invention will be described below. The device of the second embodiment partially restricts the ignition timing control conducted for each cylinder separately when the prerequisite conditions of imbalance detection are fulfilled. Thus, in the above-described first embodiment, when the prerequisite conditions of imbalance detection (S101) are fulfilled, the ignition timing control conducted for each cylinder separately is restricted or entirely stopped, but the revolution speed fluctuations still may be restricted by the ignition timing control conducted for each cylinder separately, provided that sufficient imbalance detection can be performed. Accordingly, in the second embodiment, the emission degradation is restricted in combination with the improvement in merchantability by partially allowing, while partially restricting, the ignition timing control conducted for each cylinder separately when the prerequisite conditions of imbalance detection are fulfilled. The mechanical configuration of the second embodiment is similar to that of the abovementioned first embodiment and detailed explanation thereof is herein omitted.

Figure 5:
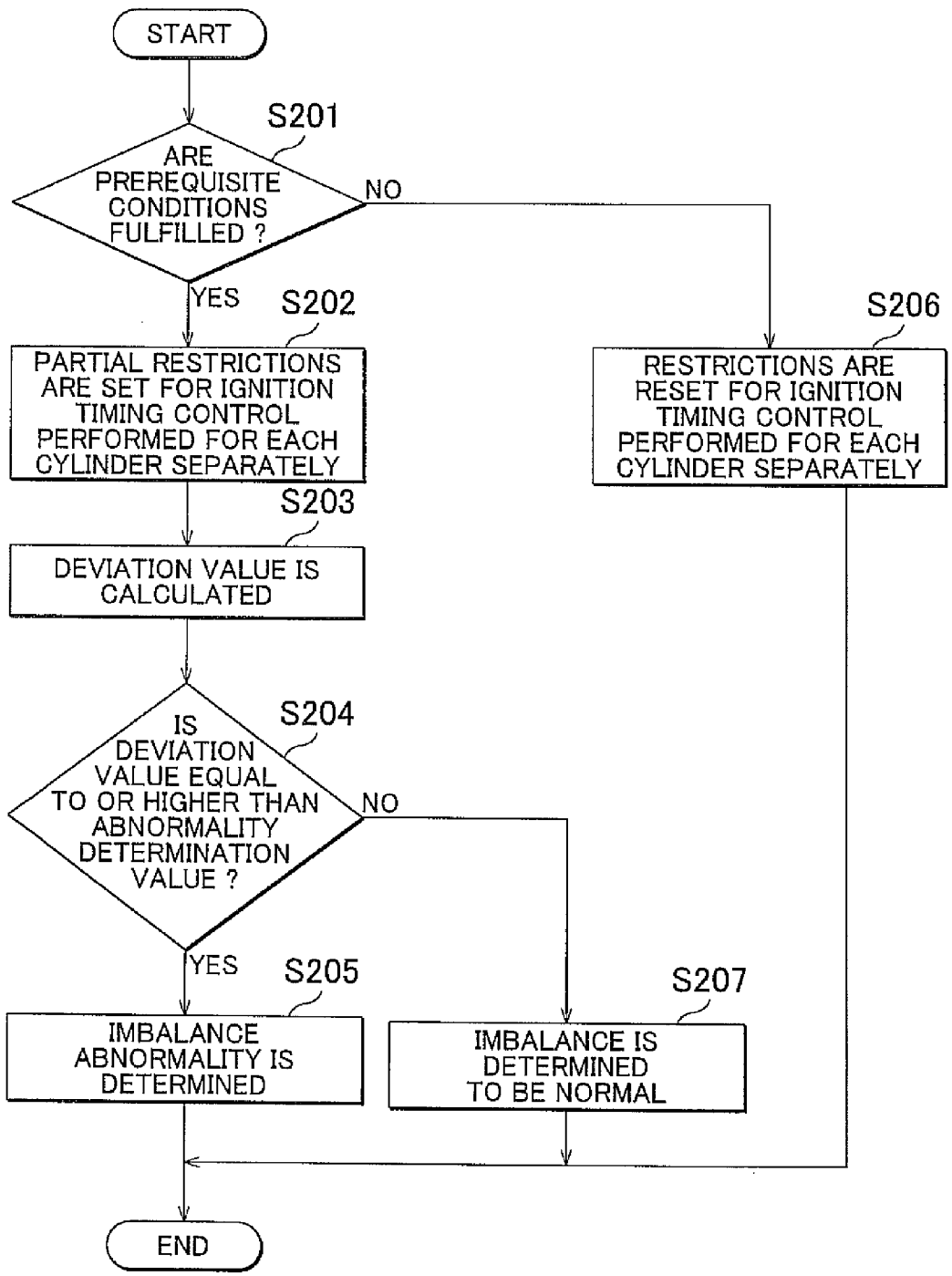
FIG. 5 is a flowchart illustrating a mixing control routine in the second embodiment of the invention.

The mixing control routine implemented in the second embodiment will be explained below with reference to FIG. 5. First, in step S201, it is determined whether or not the prerequisite conditions suitable for performing the imbalance abnormality detection have been fulfilled. The prerequisite conditions are similar to conditions (1) to (4) used in step S101 of the first embodiment.

When the prerequisite conditions are fulfilled, a partial restriction of the ignition timing control conducted for each cylinder separately is set in step S202. This partial restriction is performed, for example, by setting a predetermined partial restriction flag in the ECU 22. The partial restriction flag is referred to in a separate routine for ignition timing control conducted for each cylinder separately, and where the restriction flag has been set, the ignition timing control conducted for each cylinder separately is performed in a partially restricted form, rather than in a complete form. More specifically, for example, when an angle of advance up to 10° CA is allowed for the base ignition timing in the usual complete ignition timing control conducted for each cylinder separately, the angle of advance is restricted to a value equal to or less than 2.5° CA in the partially restricted ignition timing control conducted for each cylinder separately. In addition to the mode of providing an upper limit for the angle of advance or angle of delay in the above-described manner, it is also possible to multiply the angle of advance by a coefficient that is greater than 0 and less than 1.

The processing from step S203 to step S207 is performed similarly to the processing from step S103 to step 107 in the aforementioned first embodiment.

In the embodiment, as a result of the above-described processing, the emission degradation is restricted in combination with the improvement in merchantability caused by reduction in revolution speed fluctuations in the internal combustion engine by partially allowing, while partially restricting, the ignition timing control conducted for each cylinder separately when the prerequisite conditions of imbalance detection are fulfilled.

The third embodiment of the invention will be explained below. The device of the third embodiment gradually restricts the ignition timing control conducted for each cylinder separately when the prerequisite conditions of imbalance abnormality detection are fulfilled. Thus, in the above-described first embodiment, the ignition timing control conducted for each cylinder separately is immediately restricted, that is, completely stopped from this point in time, when the prerequisite conditions (S101) of imbalance abnormality detection are fulfilled, but with such a configuration the level of vibrations in the internal combustion engine can change rapidly from good (small) to bad (large), following the start of restriction of the ignition timing control conducted for each cylinder separately, and merchantability can be lost. For this reason, in the third embodiment, the level of vibrations is prevented from degrading rapidly and decrease in merchantability is restricted by gradually restricting the ignition timing control conducted for each cylinder separately (that is, the control amount is gradually decreased) when the prerequisite conditions of imbalance abnormality detection are fulfilled. The mechanical configuration of the third embodiment is similar to that of the abovementioned first embodiment and detailed explanation thereof is herein omitted.

Figure 6:
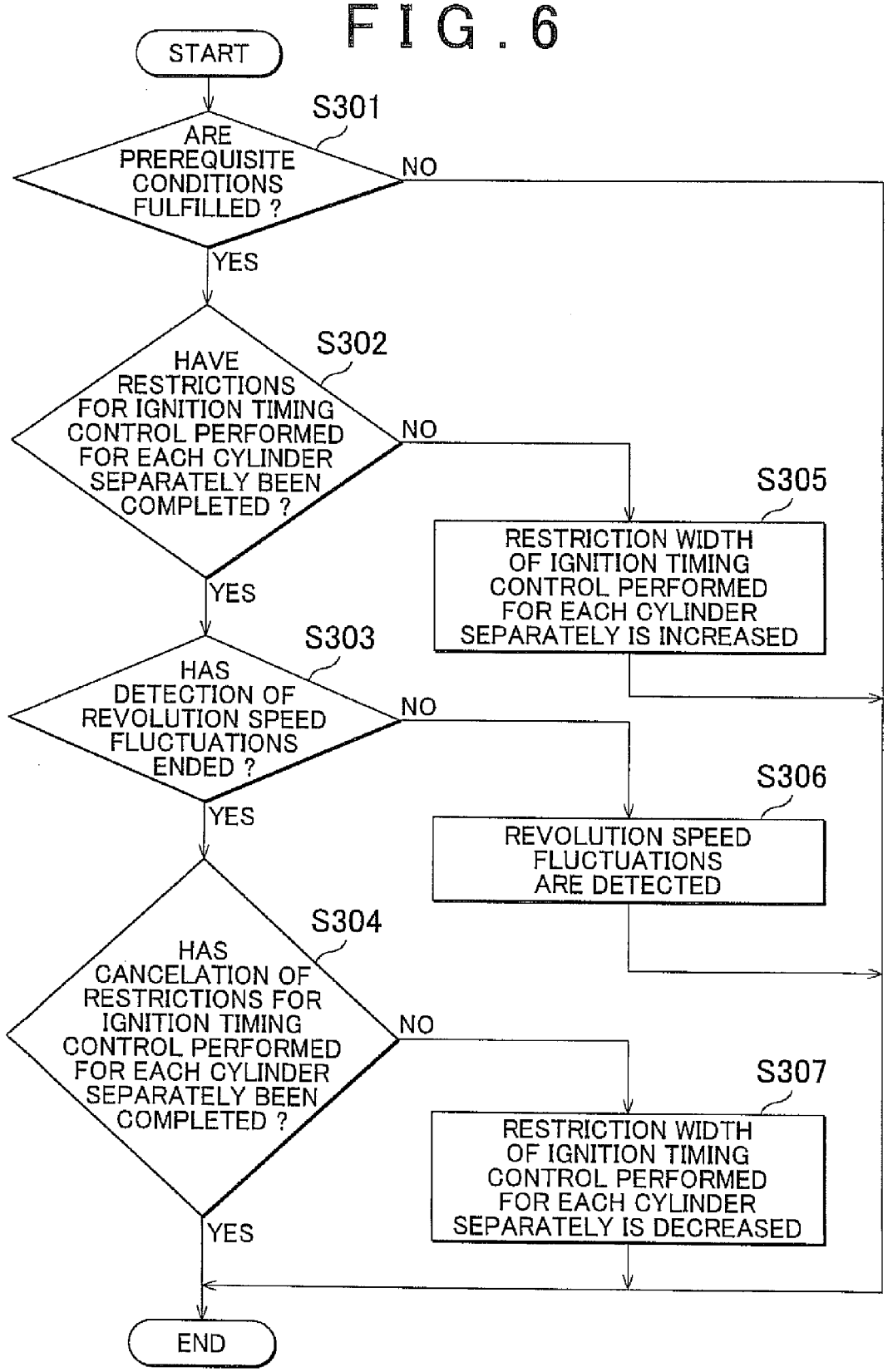
FIG. 6 is a flowchart illustrating a mixing control routine in the third embodiment of the invention.

The mixing control routine implemented in the third embodiment will be explained below with reference to FIG. 6. First, in step S301, it is determined whether or not the prerequisite conditions suitable for performing the imbalance abnormality detection have been fulfilled. The prerequisite conditions are similar to conditions (1) to (4) used in step S101 of the first embodiment.

When the prerequisite conditions are fulfilled, it is determined in step S302 as to whether the restriction of ignition timing control conducted for each cylinder separately has been completed. The wording of "the restriction has been completed" used herein means that the restriction of ignition timing control conducted for each cylinder separately has been completely performed. At the initial stage, the restriction is not performed and therefore a negative determination is made.

Then, in step S305, the restriction width of the ignition timing control conducted for each cylinder separately is increased. The restriction width as referred to herein is the restriction amount (value or ratio) of the ignition timing control conducted for each cylinder separately and this width is equal to zero at the initial stage. However, for example, when an angle of advance up to 10° CA is allowed for the base ignition timing in the usual complete ignition timing control conducted for each cylinder separately, the allowed angle of advance is reduced by 1° CA per 1 sec. In addition to the mode in which the predetermined angle of advance is thus reduced a plurality of times, it is also possible to repeat a step of multiplying the angle of advance by a coefficient greater than 0 and less than 1 a plurality of times with a predetermined period and determine the completion by the point of time in which the angle of advance becomes less than a predetermined value. The increase in the restriction width or decrease in the control amount may also be nonlinear.

Where the restriction of the ignition timing control conducted for each cylinder separately is completed, that is, the ignition timing control conducted for each cylinder separately is completely stopped as a result of repeating steps S301, S302, and S305, a positive determination is made in step S302 and it is then determined whether the detection of revolution speed fluctuations for detection of inter-cylinder air-fuel ratio imbalance abnormality has ended (S303). At the initial stage, the determination is negative and the detection of revolution speed fluctuations is performed (S306). The detection of revolution speed fluctuations is performed repeatedly till completion, and where it is completed, the imbalance abnormality determination is performed by a separate processing routine (for example, the routine similar to steps S103 to S105 and S107 in the above-described first embodiment).

Where the detection of revolution speed fluctuations ends, a positive determination is made in step S303 and the restriction width of the ignition timing control conducted for each cylinder separately is then gradually reduced (S307) till the cancellation of the ignition timing control conducted for each cylinder separately is completed (S304). This processing can be said to be the reversal of the above-described steps S302 and S305, and the restriction amount (value or ratio) of the ignition timing control conducted for each cylinder separately is gradually reduced from 100% to 0%. As a result, when an angle of advance up to 10° CA is allowed with respect to the base ignition timing in the usual complete ignition timing control conducted for each cylinder separately, the angle of advance is increased by 1° CA per 1 sec. The decrease in the restriction width or increase in the control amount may also be nonlinear.

In the embodiment, as a result of the above-described processing, the ignition timing control conducted for each cylinder separately is gradually restricted when the prerequisite conditions of imbalance abnormality detection are satisfied. Therefore, the level of vibrations in the internal combustion engine can be prevented from degrading rapidly and the decrease in merchantability can be restricted. Since the restriction of the ignition timing control conducted for each cylinder separately is gradually canceled, provided that the detection of revolution speed fluctuations for imbalance abnormality detection has ended, cancellation of revolution speed fluctuations is performed gradually and the user's uneasiness can be prevented.

The fourth embodiment of the invention will be described below. In the device of the fourth embodiment, a small correction amount (control amount) created by the ignition timing control conducted for each cylinder separately is added as a prerequisite condition of imbalance abnormality detection.

The ignition timing control conducted for each cylinder separately corresponds to the feedback control of revolution speed fluctuation value. Therefore, the control amount is difficult to change rapidly and usually the control amount increases gradually. Meanwhile, when imbalance abnormality detection is necessary, large revolution speed fluctuations are demonstrated and therefore a comparatively large control amount is also required for the ignition timing control conducted for each cylinder separately in order to restrict such fluctuations. However, before the control amount increases, there is a period with a small control amount. Accordingly, in the embodiment, the detection accuracy of imbalance abnormality detection is ensured, without restricting the ignition timing control conducted for each cylinder separately, by adding a small correction amount (control amount) created by the ignition timing control conducted for each cylinder separately as a prerequisite condition of imbalance abnormality detection. The mechanical configuration of the fourth embodiment is similar to that of the abovementioned first embodiment and detailed explanation thereof is herein omitted.

The mixing control routine implemented in the fourth embodiment will be explained below. First, it is determined whether or not the prerequisite conditions suitable for performing the imbalance abnormality detection have been fulfilled. The prerequisite conditions include the condition of (5) the correction amount (control amount) created by the ignition timing control conducted for each cylinder separately being equal to or less than a predetermined value in addition to the conditions (1) to (4) used in step S101 of the first embodiment. When such prerequisite conditions are fulfilled, the inter-cylinder air-fuel ratio imbalance abnormality detection is performed, for example, by a processing similar to that of steps S103 to S105 and S107 in the first embodiment, and the imbalance abnormality detection is not performed when the prerequisite conditions are not fulfilled.

In the embodiment, as a result of the above-described processing, a small correction amount (control amount) created by the ignition timing control conducted for each cylinder separately is added as a prerequisite condition of imbalance abnormality detection. Therefore, the detection accuracy of imbalance abnormality can be ensured without restricting the ignition timing control conducted for each cylinder separately.

The fifth embodiment of the invention will be described below. The device of the fifth embodiment has a configuration further including a purge device for purging the evaporated fuel into the intake system and a purge concentration detector that detects a purge concentration in the intake system, in which when the purge concentration is equal to or higher than a predetermined value, the restriction on implementation of the ignition timing control conducted for each cylinder separately is canceled before the imbalance abnormality detection is performed.

In an internal combustion engine having a purging device that purges the evaporated fuel that has evaporated from the fuel tank into the intake system, when large revolution speed fluctuations occur due to combustion instability caused by a high concentration of purge, it is impossible to determine whether such large revolution speed fluctuations are caused by inter-cylinder imbalance of air-fuel ratio or high concentration of purge. Therefore, in such an internal combustion engine, the condition of "the purge concentration being less than a predetermined value" is necessary as a prerequisite condition for implementing the detection of inter-cylinder air-fuel ratio imbalance abnormality. However, for example, where a high purge concentration is maintained in such a configuration, the detection of imbalance abnormality is not performed in this period and a state in which an inter-cylinder air-fuel ratio imbalance abnormality is present is allowed for a long time. Accordingly, in the embodiment, when the purge concentration is equal to or higher than a predetermined value, the restriction of implementation of the ignition timing control conducted for each cylinder separately is canceled before the imbalance abnormality detection is performed. As a result, drivability is improved due to restriction of revolution speed fluctuations resulting from the implementation of the ignition timing control conducted for each cylinder separately.

Figure 7:
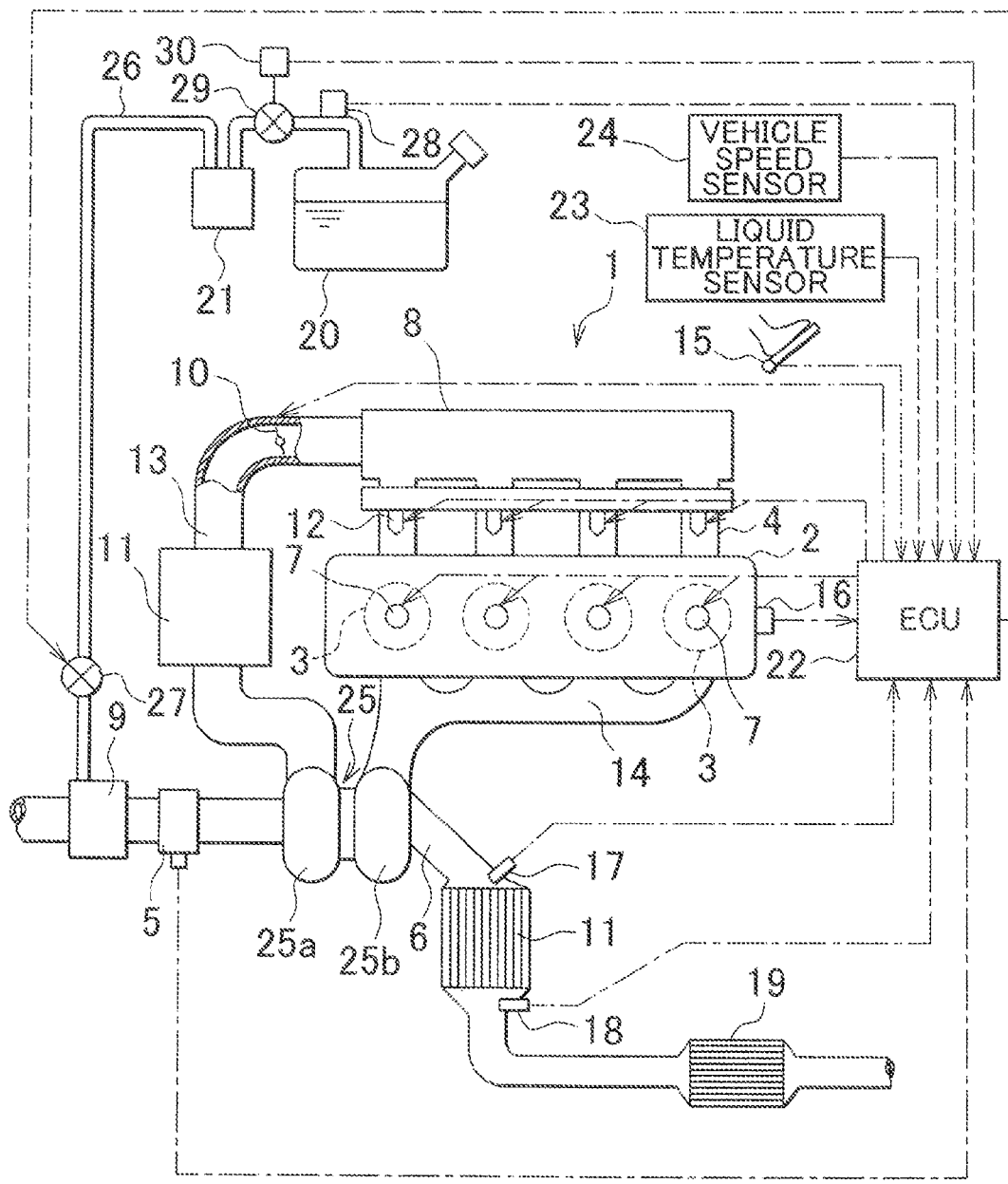
FIG. 7 is a schematic diagram illustrating the internal combustion engine according to the fifth embodiment of the invention.

The device of the fifth embodiment is provided with a purge device that purges the evaporated fuel into the intake system. As shown in FIG. 7, a vapor passage 26 is connected to a fuel tank 20. The vapor passage 26 leads to an air cleaner 9 via a charcoal canister 21 that temporarily adsorbs the evaporated fuel. A purge flow rate control valve 27 of electric system for controlling the opening degree of the vapor passage 26 is provided therein. The vapor passage 26 is also provided with a tank pressure sensor 28 for detecting the internal pressure in the fuel tank 20. A tank pressure control valve 29 that opens when the pressure inside the fuel tank 20 is equal to or higher than a predetermined value and a switch 30 for detecting the opening-closing state of the valve are disposed between the fuel tank 20 and the charcoal canister 21. The purge flow rate control valve 27 is connected to the output port of the ECU 22, and the tank pressure sensor 28 and switch 30 are connected to the input port of the ECU 22, the connections being made by means of the respective predetermined A/D or D/A converters. Other components of the mechanical configuration of the fifth embodiment are similar to those of the abovementioned first embodiment and the explanation thereof is herein omitted.

The mixing control routine implemented in the fifth embodiment will be explained below with reference to FIG. 8. First, in step S501, it is determined whether the imbalance abnormality detection has ended. In the initial state, since the imbalance abnormality detection has not ended, a negative determination is made. Then, in step S502, it is determined whether the purge concentration is equal to or higher than a predetermined reference value P1. This reference value P1 is such that when the purge concentration is equal to or higher than this value, revolution speed fluctuations can occur due to a high concentration of purge, which is not suitable for inter-cylinder air-fuel ratio imbalance abnormality detection. The purge concentration can be estimated on the basis of detection values of the pre-catalyst sensor 17, the post-catalyst sensor 18, tank pressure sensor 28, switch 30, and air flow meter 5 and the operation state of the purge flow meter control valve 27.

When the purge concentration is less than the reference value P1, it is then determined whether the purge concentration is less than a predetermined reference value P2 (S504). The reference value P2 is set less than the reference value P1 and somewhat higher than a concentration value P3 serving as an imbalance abnormality detection condition. When a negative determination is made, the processing is reset.

When the purge concentration is less than the predetermined reference value P2, it is then determined whether the purge concentration is less than the predetermined reference value P3 (S505). The reference value P3 is a concentration value serving as an imbalance abnormality detection condition. When a positive determination is made, the imbalance abnormality detection is implemented, for example, by a processing similar to that of steps S103 to S105 and S107 in the abovementioned first embodiment (S508).

When a negative determination is made, it is then determined whether the restriction of the ignition timing control conducted for each cylinder separately has ended (S506). The "end of restriction" as referred to herein means that the restriction of the ignition timing control conducted for each cylinder separately has been entirely performed, in the same manner as in step S302 of the above-described third embodiment. At the initial stage, the restriction is not performed and therefore a negative determination is made.

Then, in step S507, the restriction width of the ignition timing control conducted for each cylinder separately is increased. The restriction width as referred to herein is the restriction amount (value or ratio) of the ignition timing control conducted for each cylinder separately, in the same manner as in step S305 of the above-described third embodiment. At the initial stage, the restriction width is zero. By contrast, when an angle of advance is allowed up to 10° CA with respect to the base ignition timing in the usual complete ignition timing control conducted for each cylinder separately, the allowed angle of advance per 1 sec is decreased to 1° CA. In addition to the mode in which the predetermined angle of advance is thus reduced a plurality of times, it is also possible to repeat a step of multiplying the angle of advance by a coefficient greater than 0 and less than 1 a plurality of times with a predetermined period and determine the completion by the point of time in which the angle of advance becomes less than a predetermined value. Moreover, the increase in restriction width and decrease in restriction amount may not be linearly performed. As a result of repeating the processing of steps S501, S502, and S504 to S507, the restriction of the ignition timing control conducted for each cylinder separately is ended, that is, the ignition timing control conducted for each cylinder separately is completely stopped, a positive determination is made in step S507, and the processing is reset.

Further, when the purge concentration is equal to or greater than the reference value P1 in step S502, the restriction of the ignition timing control conducted for each cylinder separately is canceled (S503). Therefore, in this case, the imbalance abnormality detection is not implemented, the ignition timing control conducted for each cylinder separately is implemented, and drivability is improved due to restriction of revolution speed fluctuations resulting from the control.

In the embodiment, as a result of the above-described processing, when the purge concentration is equal to or greater than the predetermined value (S502), the restriction of implementation of the ignition timing control conducted for each cylinder separately is canceled (S503) before the imbalance abnormality detection is implemented. As a result, drivability is improved due to restriction of revolution speed fluctuations resulting from the ignition timing control conducted for each cylinder separately.

The preferred embodiments of the invention are described in detail above, but various other embodiments of the invention can be considered. For example, in the aforementioned embodiments, a configuration is used in imbalance abnormality detection such that the warning and information are stored when an imbalance abnormality is present (S105), but it is also possible to perform feedback control such that eliminates the imbalance abnormality, for example, by increasing or reducing the fuel injection amount by an amount determined from a predetermined map according to the deviation value Dev (#i).

While the invention has been described with reference to example embodiments thereof, it is to be understood that the invention is not limited to the example described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the invention.

What is claimed is:

1. An inter-cylinder air-fuel ratio imbalance abnormality detection device for a multi-cylinder internal combustion engine, comprising:
   an abnormality detector that detects an inter-cylinder air-fuel ratio imbalance abnormality on the basis of revolution speed fluctuations in the multi-cylinder internal combustion engine;
   an ignition timing control device that controls ignition timing so as to restrict revolution speed fluctuations in the multi-cylinder internal combustion engine; and
   an restricting device that restricts the operation of the ignition timing control device when the abnormality detector is operated.

2. The inter-cylinder air-fuel ratio imbalance abnormality detection device according to claim 1, wherein
   the restricting device completely inhibits the operation of the ignition timing control device when the abnormality detection device is operated.

3. The inter-cylinder air-fuel ratio imbalance abnormality detection device according to claim 1, wherein the restricting device partially inhibits the operation of the ignition timing control device when the abnormality detection device is operated.

4. The inter-cylinder air-fuel ratio imbalance abnormality detection device according to claim 1, wherein
the restricting device gradually restricts ignition timing control of the ignition timing control device when the abnormality detection device is operated.

5. The inter-cylinder air-fuel ratio imbalance abnormality detection device according to claim 1, wherein
the restricting device performs abnormality detection when a control amount determined by ignition timing control of the ignition timing control device is equal to or less than a predetermined value and does not perform abnormality detection when the control amount is greater than the predetermined value.

6. The inter-cylinder air-fuel ratio imbalance abnormality detection device according to claim 1, further comprising:
a purge device that purges evaporated fuel into an intake system; and
a purge concentration detection device that detects a purge concentration in the intake system, wherein
the restricting device cancels the restriction of operation of the ignition timing control device before the operation of the abnormality detection device when the purge concentration is equal to or greater than a predetermined value.

7. An inter-cylinder air-fuel ratio imbalance abnormality detection method for a multi-cylinder internal combustion engine,
the method comprising:
detecting an inter-cylinder air-fuel ratio imbalance abnormality on the basis of revolution speed fluctuations in the internal combustion engine;
controlling ignition timing so as to restrict revolution speed fluctuations in the multi-cylinder internal combustion engine; and
restricting the implementation of the ignition timing control when the abnormality detection is implemented.

* * * * *